United States Patent [19]

Morrow et al.

[11] 3,787,765

[45] Jan. 22, 1974

[54] DIRECT READING PHASE METER

[75] Inventors: Robert S. Morrow, Columbus; Lloyd D. Penn, Johnstown; Arthur D. Marcum, Gahanna, all of Ohio

[73] Assignee: IRD Mechanalysis Inc., Worthington, Ohio

[22] Filed: Jan. 12, 1972

[21] Appl. No.: 217,165

[52] U.S. Cl. ............................................. 324/83 A
[51] Int. Cl. .............................................. G01r 25/00
[58] Field of Search .......................... 324/83 A, 83 R

[56] References Cited
UNITED STATES PATENTS 3,052,844   9/1962   Varterasian ...................... 324/83 A
2,517,805   8/1950   Spindler ........................... 324/83 A Primary Examiner—Alfred E. Smith
Attorney, Agent, or Firm—Harry B. Keck

[57] ABSTRACT

A direct reading meter for indicating the phase relationship of two input electrical signals having the same frequency. The meter employs a DC voltmeter with two scales over its range. The meter also is provided with an indicator, such as two different lamps, for indicating which one of the two scales is concurrently applicable to the meter indication.

A threshold limiter may be provided to deactivate the meter unless the amplitude of one of the input signals exceeds a pre-established minimum value.

8 Claims, 7 Drawing Figures

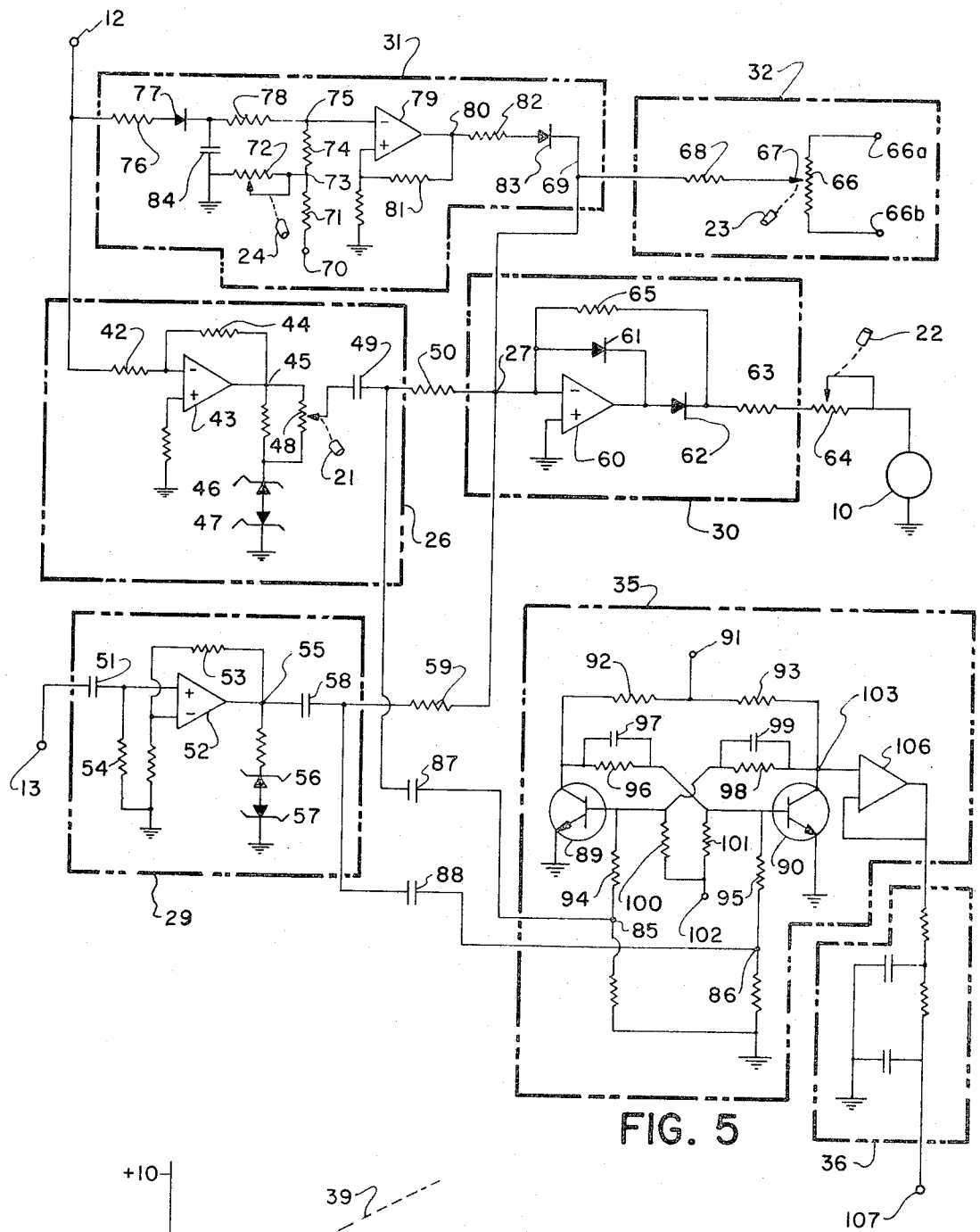
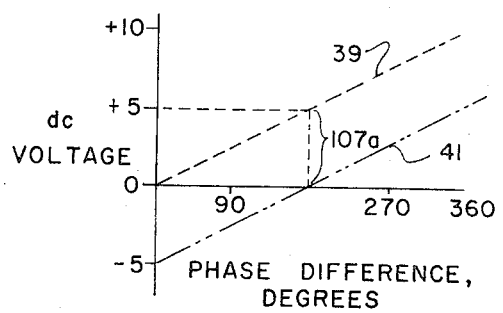
FIG. 7

DIRECT READING PHASE METER

BACKGROUND OF THE INVENTION

1. Field of the Invention

Direct reading phase meters free from electrical ambiguity.

2. Description of the Prior Art

The mechanical vibration analysis art has many instances where an indication of the phase relationship between two electrical signals is important in evaluating unbalance observations. The customary technique for indirectly indicating the phase relationship is to drive a stroboscopic lamp at a cyclically repeating rate in response to one input signal and to develop another input signal in response to rotor unbalance; a fixed mark on the rotating body undergoing observation will appear to be frozen at a particular phase position related to the phase relationship of the two signals. See U. S. Pat. No. 3,228,235.

Direct reading phase meters employ two reference signals, one of which is developed cyclically as a pulse reference signal and the other of which is developed as a sinusoidal vibrational signal. See U. S. Pat. No. 3,331,252 and 3,501,965. The pulse reference signal is converted into a synchronous sinusoidal reference signal whose phase is then compared with that of the vibrational signal. The two sinusoidal signals are modified and are employed to drive a 360° rotary meter to supply a direct reading of the phase relationship.

A further technique employs a synchronous sine wave generator which delivers a reference signal to one set of input terminals of an oscilloscope. A vibrational signal is applied to the other set of input terminals to provide a visual presentation of a phase relationship on an oscilloscope screen. See U. S. Pat. No. 3,077,781.

These known phase relationship indicators have certain deficiencies. The stroboscope technique requires interpretation of the observations by an operator and does not present any positive numerical information which can be automatically recorded. The direct reading phase meters having a 360° circular scale are quite expensive and require rather elaborate circuitry to convert the input signals into usable meter operating input signals. The oscilloscope technique is similar to the stroboscope technique in that it fails to provide a recordable value and requires operator observation and interpretation. The system moreover requires a relatively expensive stroboscope.

SUMMARY OF THE INVENTION

The present phase meter is a direct reading DC voltmeter having two scales and having an indicator for identifying which scale is operational. The scales range from 0° to 180° in one direction (clockwise, for example) and from 180° to 360° in the opposite direction (counter-clockwise, in the assumed example). A relatively inexpensive DC voltmeter is employed. The meter indication represents the phase difference between two input electrical signals of the same frequency. While the phase meter of this invention is particularly applicable to mechanical vibration analysis apparatus, its utility extends to any system wherein a positive indication of the phase difference between two electrical input signals of the same frequency is desirable.

Briefly the two input signals are converted from sine waves to square waves of the same frequency. In a preferred embodiment, one of the two signals is inverted. The square wave signal (A) and the inverted square wave signal (B) are added and their sum, a positive DC voltage, is employed to drive a DC voltmeter. Their sum has a value of zero when the two signals are in phase. Their sum has a full scale voltmeter reading when the two signals are 180° out of phase. The sum has a mid-scale reading when the two signals are 90° or 270° out of phase. Thus, except at the two extreme eges of the voltmeter scale, the voltmeter readings are ambiguous. The ambiguity is resolved in this invention by providing an indicator which visually (or otherwise, e.g., audibly or electrically) indicates one circumstance when the two input signals are from zero to 180° out of phase and the other circumstance when the two input signals are from 180° to 360° out of phase.

As a further refinement a threshold limiting device precludes operation of the phase meter unless one of the input signals has a pre-established minimum amplitude.

BRIEF DESCRIPTION OF THE DRAWINGS

FIG. 5 is a schematic illustration of essential components which are otherwise shown in the block diagram of FIG. 4;

FIG. 7 is a graphical representation of a voltage phase difference characteristic employed in circuitry of FIG. 6.

DESCRIPTION OF THE PREFERRED EMBODIMENT(S)

Figure 1:
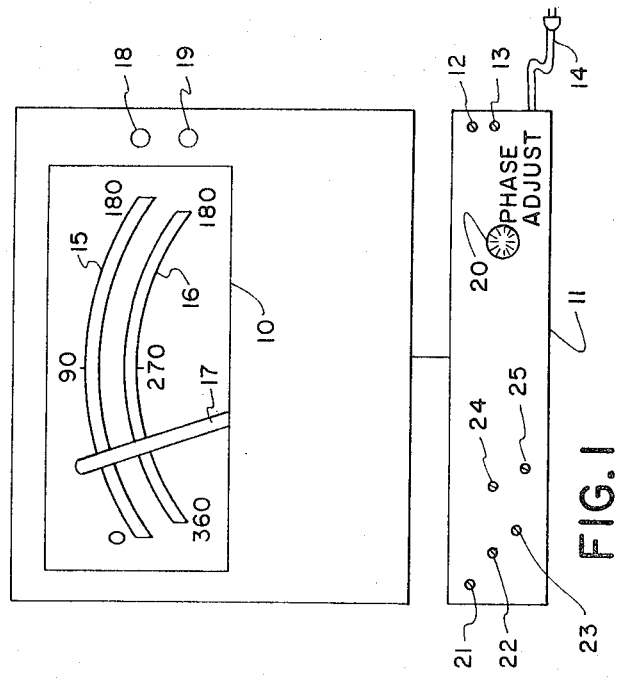
FIG. 1 is a plan view of the phase meter of this invention.

A phase meter 10 operating circuitry in a casing 11 includes two input terminals 12, 13 and a source of electrical power 14 which may be AC or DC. The unit may be self-powered by providing a battery power source. The phase meter 10 consists of a DC voltmeter having two scales 15, 16 and a meter needle 17. The scale 15, as shown, is calibrated from zero to 180° in a clockwise direction. The scale 16 is calibrated from 180° to 360° in a counter-clockwise direction. It is apparent that there is an ambiguity when the needle 17 is in the illustrated position, i.e., the reading is either 40° or 320°. In order to resolve the ambiguity, a pair of lamps 18, 19 is provided adjacent to the scales 15, 16. The scale 15 preferably is printed in the same color as the lamp 18 (e.g., red) and the scale 16 preferably is printed in the same color as the lamp 19 (e.g., green). Thus the operator reads the indication of the needle 17 on that scale having the color corresponding to the one lamp, of the two lamps 18, 19, which is illuminated. Only one of the two lamps 18, 19 is illuminated at any one instant.

the circuitry casing 11 also includes a phase adjustment knob 20 to be hereinafter described and a number of potentiometer or rheostat adjustment knobs 21, 22, 23, 24, 25.

In the normal application of the present phase meter, a reference sinusoidal signal is applied to the input terminal 13. A vibration responsive signal, also sinusoidal and having the same frequency as the reference signal, is applied to the input terminal 12. The meter 10 will automatically indicate the phase relationship between the two signals.

Figure 2:
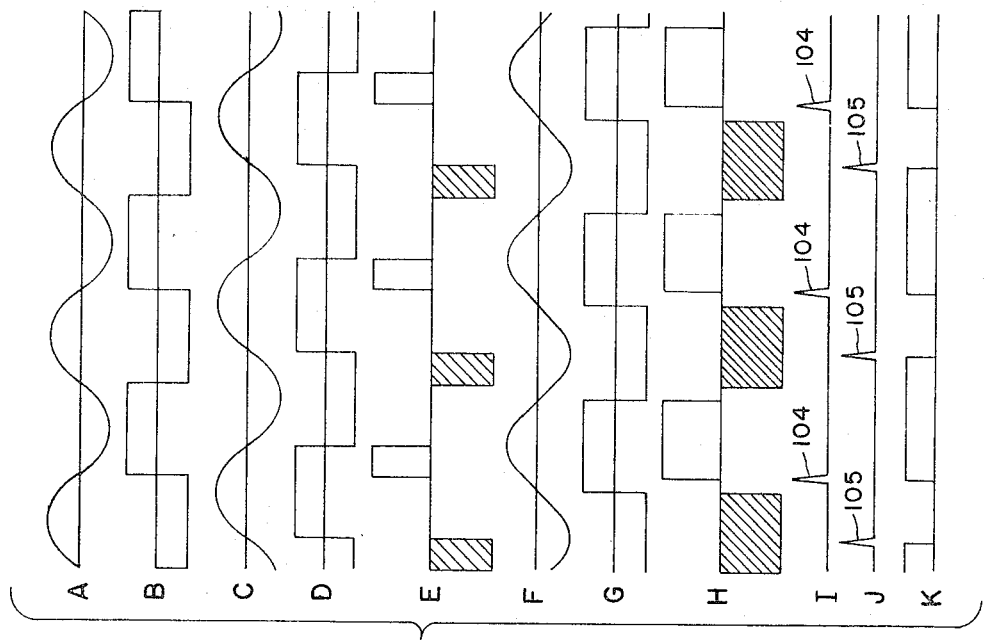
FIG. 2 presents graphical representations of electrical signals more fully described hereinafter.

Referring to FIG. 2 a typical vibration signal is presented at A. An inverted square wave signal B is derived from the signal A. Note that when the signal A is positive, the signal B is negative. A similar reference signal is presented at C. The reference signal C lags the reference signal A by approximately 60°. The signal D is a square wave derived from the reference signal C. It will be observed that the square wave D is positive when the reference signal C is positive. The signals B and D have the same amplitude.

The summation of the two square wave signals B and D is represented at E. The amplitude of the signal E is twice that of the signal B (or D). The signal E is positive for one-sixth of a cycle; is negative for one-sixth of a cycle; and is absent (i.e., zero) for two-thirds of a cycle.

Note also that if the vibrational signal A and the reference signal were directly in phase, then the inverted square wave corresponding to the vibration signal A would be at all points equal and opposite to the square wave derived from the reference signal; the summation of the two resulting derived square waves would be zero voltage.

As another example the reference signal F is presented in FIG. 2. The signal F lags the signal A by 150°. A square wave corresponding to the signal F is presented at G. The summation of the square wave G and the inverted square wave B is presented as the signal H which has twice the amplitude of the signal B (or G). The signal H is positive for five-twelfths of a cycle; is negative for five-twelfths of a cycle; and is absent (i.e., zero) for one-sixth of a cycle.

Note finally that if the vibratory signal A were 180° out of phase with the reference signal, then the square wave derived from the reference signal would coincide with the inverted square wave derived from the vibrating signal. The resulting summation signal would be positive for one-half cycle and negative for the other half cycle.

Figure 3:
FIG. 3 graphically presents the voltage-phase difference characteristic which is developed in the circuitry of this invention.

By considering only the negative components of the summation signals 2-E or 2-H, it is possible to develop a characteristic as shown in FIG. 3 where the DC voltage (the shaded area of signals 2-E and 2-H) increases linearly from zero (when the two signals are in phase) to a maximum (when the two signals are 180° out of phase) and thereafter decreases linearly from the maximum to zero (when the two signals are again in phase). By suitably calibrating a DC voltmeter, the summation signal will provide an accurate representation of the phase difference between the two input signals.

Figure 4:
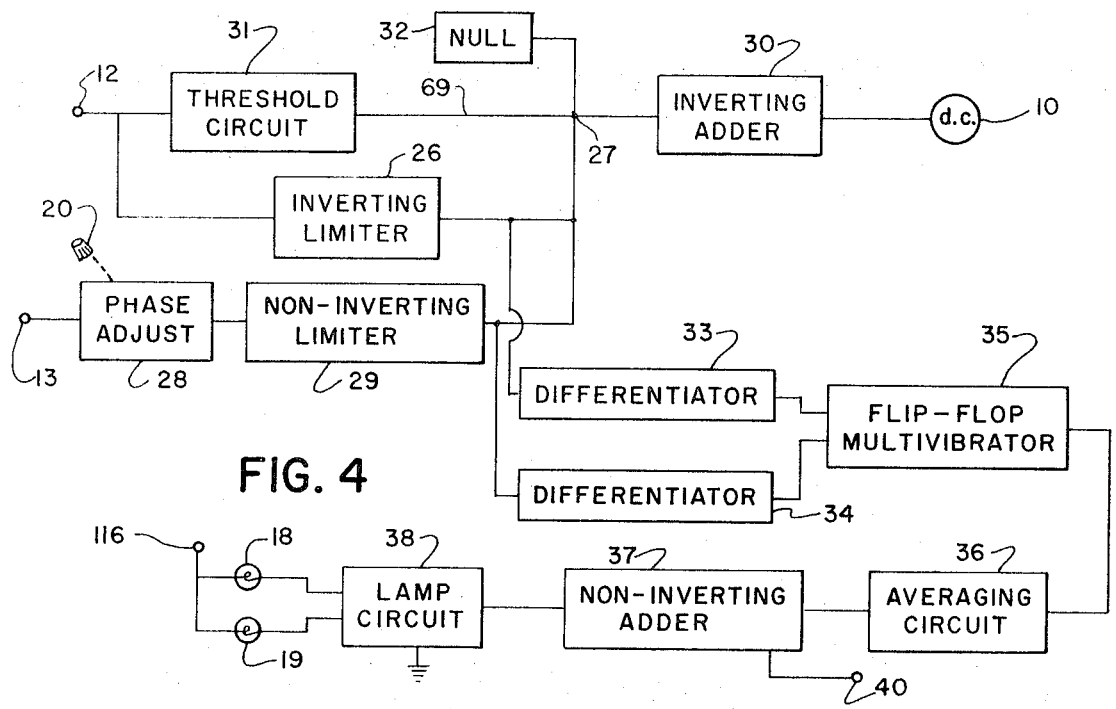
FIG. 4 is a schematic block diagram of the circuitry employed in this invention.
Figure 6:
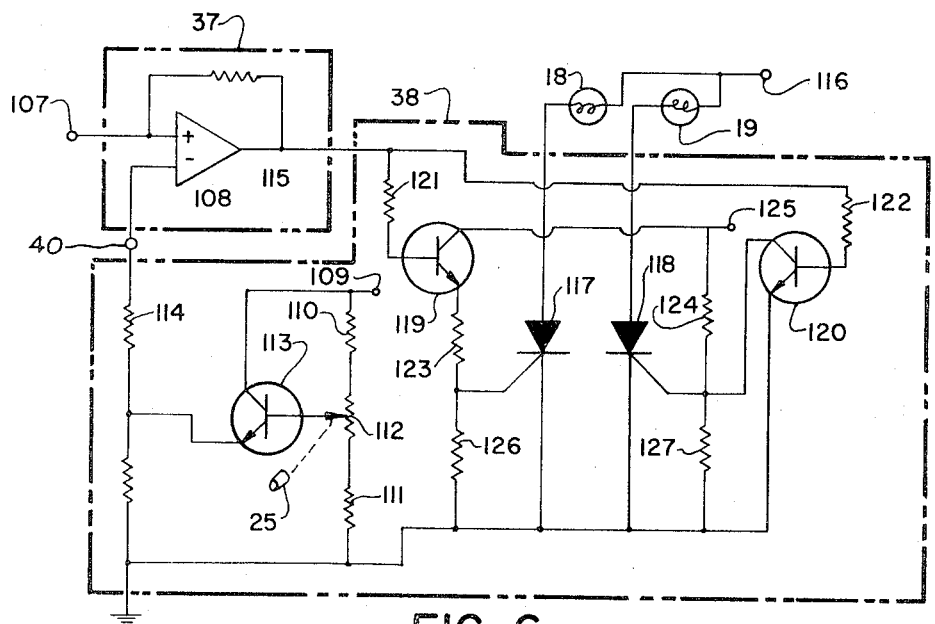
FIG. 6 is a schematic illustration of other essential components appearing as block elements in FIG. 4.

The means for accomplishing this result are set forth in FIGS. 4, 5, 6. As shown in FIG. 4, the circuitry includes input terminals 12, 13, a DC voltmeter 10 and indicator lamps 18, 19. The input terminal 12 is connected through an inverting limiter 26 to a mixer terminal 27. The input terminal 13 is connected through a phase adjust circuit 28, normally set for zero adjustment, thence through a non-inverting limiter 29 to the mixer terminal 27. The summation of the output signal from the inverting limiter 26 and the non-inverting limiter 29 is delivered from the terminal 27 through an inverting adder 30 to the voltmeter 10. The terminal 12 is also connected to the mixer terminal 27 through a threshold circuit 31 which delivers a positive signal to the mixer terminal 27 unless the input signal at the terminal 12 exceeds a pre-established minimum. The positive signal at the mixer terminal 27 generates a zero level signal at the output of the inverting adder 30.

A null circuit 32 provides a positive or a negative signal at the mixer terminal 27 to compensate any inherent offset characteristic of the adder circuit. The nulling circuit 32 normally is factory adjusted to the inherent characteristics of the circuit elements.

The output of the inverting adder 30 is an electrical signal having a value of zero when the signals applied to terminals 12, 13 are in phase and having a maximum value of full scale deflection on the voltmeter 10 when the signals applied to the terminals 12, 13 are 180° out of phase. Thus the DC voltmeter 10 produces a response according to the characteristic curve of FIG. 3.

The lamp indication circuitry includes a pair of differentiators 33, 34 connected to opposite sides of a flip-flop multivibrator 35. The output from the flip-flop multivibrator 35 is delivered through an averaging circuit 36 to a non-inverting adder 37 and finally through a lamp circuit 38 which energizes one or the other of the two lamps 18, 19.

The output from the inverting limiter 26 is a square wave which is delivered through the differentiator 33 to produce a pulse for each transition from negative to positive. Similarly the output from the non-inverting limiter 29 is delivered to the differentiator 34 to produce a pulse as the signal passes from negative to positive. The pulse from one differentiator serves to cause the multivibrator 35 to deliver an output signal. The pulse from the other differentiator serves to turn off the multivibrator 37 and produce a zero signal as an output. If the two pulses from the differentiators 33, 34 occur 180° out of phase with each other, then the multivibrator 35 will conduct for one-half of its duty cycle and will be non-conducting for the other one-half of its duty cycle. As the lag time of the turn off pulse signal increases from zero, the duration of the duty cycle of the multivibrator 35 increases from zero to a maximum as the lag time approaches 360°. The output signal from the multivibrator 35 is thus an interrupted DC signal which can be averaged in the averaging circuit 36 to produce a direct current signal having an amplitude corresponding to the phase difference between the two input signals from the differentiators 33, 34. This is represented by FIG. 7 wherein the DC voltage 39 varies linearly with the phase difference over the range zero to 360°. If the full scale voltage value is 10 volts, as shown in FIG. 7, then the intermediate value is 5 volts at 180°. The signal represented by the numeral 39 in FIG. 7 is the output of the averaging circuit 36. A positive voltage from a source terminal 40 (FIG. 4) is developed to have exactly the voltage of the mid-range characteristic which, in FIG. 7, is 5 volts. This signal from the terminal 40 is combined with the output of the averaging circuit 36 in the non-inverting adder 37 to produce a resulting signal as shown by the numeral 41 in FIG. 7. The signal 41 consists of the signal 39 to which a negative 5 volts has been added. It will be observed that the signal 41 has the linear characteristic of the signal 39 but that for all values from zero to 180° phase difference the signal 41 has a negative value and for all values from 180° to 360°, the signal 41 has a positive value. The signal 41 is applied to the lamp circuit 38 which responds by igniting one lamp 19 when the signal 41 is negative and the other lamp 19 when the signal 41 is positive. Thus the lamps 18, 19 can be related to the phase relationship of the two input signals to provide a resolution of the inherent ambiguity of the double scaled voltmeter 10.

The circuitry will be more particularly described by reference to FIG. 5 wherein the input vibration signal, a sinusoidal signal, is applied to the terminal 12, and delivered through a resistor 42 to the negative terminal of an integrated circuit 43 operating as an inverting amplifier. The resistor 44 in combination with the resistor 42 establishes a high gain output in excess of 100 amplification at the output terminal 45.

A pair of Zener diodes 46, 47 have a common anode connection and serve to limit the amplitude of the amplified signal at the terminal 45. Normally a pair of 5-volts break down Zener diodes 46, 47 is provided so that the signal at the terminal 45 cannot exceed 5 volts which limits the amplified sine wave at the terminal 45 and sharpens the "squareness" of the resulting signal. The square wave output from the terminal 45 is delivered through a potentiometer 48, a coupling capacitor 49 and an adding resistor 50 through a mixer terminal 27.

A similar circuit 29 is provided for the reference signal which is delivered from the reference signal input terminal 13 through a capacitor 51 to the positive terminal of an integrated circuit 52 operating as a non-inverting limiter. The resistors 53, 54 provide for the same amplification in the integrated circuit 52 as is presented in the integrated circuit 43. The resulting signal at the terminal 55 is limited to a constant maximum voltage by two Zener diodes 56, 57 having common anodes. The Zener diodes 56, 57 have the same characteristics as the Zener diode 46, 47. The resulting limited amplified sine wave appearing as a "square wave" at the output terminal 55 is delivered through a coupling capacitor 58 and an adding resistor 59 to the mixer terminal 27. It will be observed that there is no potentiometer in the non-inverting limiter 29. The potentiometer 48 of the inverting limiter 26 permits adjustment of the output at mixer terminal 50 to match the output of the non-inverting limiter 29. The potentiometer 48 is pre-adjusted at the factory by a suitable adjustment knob 21 (see FIG. 1). The adjustment assures that the amplitude of the two square waves (2-B and 2-D, or 2-B and 2-G of FIG. 2) is identical.

The signal from the adding resistor 50 corresponds to the signal B (FIG. 2) whereas the signal from the adding resistor 59 corresponds to the signal D or G (FIG. 2). These two signals are added at the mixer terminal 27 and delivered to the negative input terminal of an integrated circuit 60 operating as an inverting adder. The negative terminal of the integrated circuit 60 is connected to the output terminal through a diode 61. The output terminal of the integrated circuit 60 also is connected through a diode 62, a load resistor 63 and a rheostat 64 to the meter 10. A resistor 65 is connected in parallel with the two diodes 61, 62. In this arrangement, a positive signal at the mixer terminal 27 results in zero amplification through the integrated circuit 60 since the diode 61 bypasses the integrated circuit 60. When the signal applied to the mixer terminal 27 is negative, the integrated circuit 60 will deliver a positive corresponding signal as an output. The integrated circuit 60 has a unity gain. Hence the inverting adder circuit 30 functions to subtract all positive signal components and to transfer all negative signal components to an inverted (i.e., positive) form. Hence the signal applied to the inverting adder 30 corresponds to the signals 2-E or 2-H of FIG. 2. The output signal from the inverting adder 30 corresponds to the characteristic of FIG. 3. The amplitude of the output signal from the inverting adder 30 is adjusted by means of a rheostat 64 having a knob 22 (see FIG. 1) so that 180 degrees phase separation between the two input signals will present a full scale reading on the meter 10. The phase adjustment knob 20 (FIG. 1) may be employed to maximize the voltage reading on the meter 10 while the rheostat 64 is being calibrated.

Nulling Circuit

Because the integrated circuit 60 has inherent offset characteristics, a small compensating voltage from nulling circuit 32 may be required in order that the output from the inverting adder 30 will be zero when the signals from the limiters 26, 29 are offset. A suitable voltage source is provided including a potentiometer 66 connected between a positive and negative terminal 66a, 66b and having an adjustable tap 67 connected through a resistor 68 to the mixer terminal 27. The potentiometer tap 67 is adjusted by means of the knob 23 (see FIG. 1).

Threshold Circuit

In order to prevent the meter 10 from providing meaningless indications when the input signal applied to the terminal 12 is a transient or unwanted signal, having an amplitude less than the pre-established value, the threshold circuit 31 normally develops a positive signal which is applied through a conductor 69 to the mixer terminal 27. The normal value of the positive voltage in the conductor 69 is sufficient to saturate the integrated circuit 60 and render it inoperative.

The threshold circuit 31 is connected in parallel with the inverting limiter circuit 26 between the input terminal 12 and the mixing terminal 27. A negative voltage source is applied to a terminal 70 and thence through a resistor 71 and rheostat 72 to ground, thereby establishing a fixed predetermined negative DC voltage at the intermediate terminal 73. The negative voltage from the terminal 73 is delivered through a resistor 74 to a mixer terminal 75. Also delivered to the mixer terminal 75 is the signal from the input terminal 12 through a resistor 76, diode 77 and resistor 78. So long as the negative voltage delivered through the resistor 74 to the mixer terminal 75 exceeds in absolute value the voltage delivered from the terminal 12 through the resistor 78, a negative summation signal will be applied to the negative input terminal of an integrated circuit 79 which is connected as an inverting amplifier. So long as a negative potential is maintained at the negative input terminal of the integrated circuit 79, a positive signal appears at the output terminal 80 which is connected through a feed-back resistor 81 to the positive input terminal of the integrated circuit 79. The feed-back resistor 81 latches the output in a positive state and feeds a positive signal through a resistor 82 and diode 83 to the conductor 69. A positive signal, applied to the negative input terminal of the integrated circuit 60 in the inverting adder 30, saturates the integrated circuit 60 so that the output from the inverting adder 30 is zero.

When a significant signal is applied to the input terminal 12, having an amplitude greater than a preestablished threshold amplitude, the resistor 76 and diode 77 function as a rectifier to deliver the positive components of that signal to the mixer terminal 75. A capacitor 84 smooths the rectified signal. When the positive value of the signal delivered through the resistor 78 exceeds the negative value of the signal delivered through the resistor 74, the mixer terminal 75 becomes a positive and a positive signal is applied to the negative input terminal of the integrated circuit 79. Because the integrated circuit 79 is connected as an inverting amplifier, the resulting positive input signal appears as a negative output at the terminal 80. The negative signal is blocked at the diode 83 so that there is no potential applied to the conductor 69 when the input signal at the terminal 12 exceeds the pre-established minimum value. Normally the preestablished minimum value will be about 5 per cent of the amplitude of the normal anticipated input signal. The precise threshold level can be determined by altering the negative potential at the terminal 73 through adjustment of the rheostat 72 by means of an adjusting knob 24 (see FIG. 1).

Scale Identification Circuitry

A flip-flop multivibrator 35 has input terminals 85, 86. The output signal from the inverting limiter 26 is delivered through a capacitor 87 to the input terminal 85; the output signal from the non-inverting limiter 29 is delivered through a capacitor 88 to the input terminal 86. The capacitors 87, 88 serve as differentiators and produce a pulsed output signal every time the applied square wave changes from negative to positive. The flip-flop multivibrator includes a pair of transistors 89, 90 having their collectors connected to a source of positive voltage at a terminal 91 through resistors 92, 93 respectively, and having their emitters grounded. The base of transistor 89 is connected through a resistor 94 to the input terminal 85. The base of transistor 90 is connected through a resistor 95 to the input terminal 86. The collector of the transistor 89 is connected to the base of transistor 90 by a resistor 96 in parallel with a capacitor 97. The collector of the transistor 90 is connected to the base of transistor 89 by a resistor 98 in parallel with a capacitor 99. The bases of transistors 89, 90 are connected by resistors 100, 101 respectively to a terminal 102 which is connected to a source of negative voltage.

Referring to FIG. 2, the signal 2-B which is the output signal of the inverting limiter 26, after differentiation appears as the signal 2-I which is applied to the terminal 85 (FIG. 5). Similarly the signal 2-C from the non-inverting limiter 29 appears after differentiation as the signal 2-J at the terminal 86. The properties of the multivibrator 35 are such that it has two stable conditions. When the pulses 104 from signal 2-I are applied to the base of the transistor 89, the multivibrator 35 develops a positive output signal at the output terminal 103. The positive output signal continues to appear at the output terminal 103 until a pulse 105 from the signal 2-J is applied to the terminal 86 and thence to the base of the transistor 90. This transfers the multivibrator 35 to its alternate state and no signal appears at the output terminal 103. Hence the output signal from the terminal 103 resulting from application of the signals 2-I and 2-J appears as the signal 2-K. It will be apparent that the duration of the duty cycle in the signal 2-K is a function of the time between application of the pulse 104 and application of the pulse 105. If the pulse 104 precedes the pulse 105 by approximately one degree, then the signal K will be conducting for approximately 1° and non-conducting for approximately 359° of its duty cycle. Similarly if the pulses 104 are 180° out of phase with the pulses 105 then the signal K will be conducting for one-half of the cycle and non-conducting for the other one-half of the cycle. Likewise if the pulse 105 precedes the pulse 104 by approximately 1°, then the signal 2-K will be positive for approximately 359° and will be zero for approximately 1°. Thus the multivibrator output, when smoothed through an integrated circuit 106 serving as a buffer, and an averaging circuit 36 will be delivered at the output terminal 107 as a DC voltage having an amplitude related to the phase difference between the pulses 104 and 105. The characteristic of the output at 107 is illustrated by the signal 39 in FIG. 7.

The averaging circuit 36 consists of a simple pi filter including a pair of resistors and a pair of capacitors.

Lamp Operating Circuit

The output signal appearing at the terminal 107 is delivered to the non-inverting adder circuit 37 and the lamp operating circuit 38 shown in FIG. 6 which includes an integrated circuit 108 connected as a non-inverting amplifier. The signal from the terminal 107 is applied to the positive terminal of the integrated circuit 108. A constant voltage signal is applied to the inverting input terminal of the integrated circuit 108 from a voltage source applied at a terminal 109. The inverting input signal has an amplitude which corresponds to the voltage at the terminal 107 which occurs when the two input (terminals 12, 13) signals are 180° out of phase. See 107a, FIG. 7. This voltage 107a is developed from a positive voltage source applied to the terminal 109 through a resistance string of resistors 110, 111 and potentiometer 112 having a center tap connected to the base of the transistor 113. The collector of the transistor 113 is connected to the terminal 109 and the emitter is connected through a resistance 114 to the negative terminal of the integrated circuit 108 and through a resistance 114a to ground. By adjusting the center tap of the potentiometer 112 with an adjustment knob 25 (see FIG. 1) the voltage value 107a applied at the negative terminal of the integrated circuit 108 can be appropriately altered. In effect the non-inverting adder 37 serves to alter the signal 39 (applied at the terminal 107) to produce the signal 41 at the output terminal 115. Thus the signal at the output terminal 115 is positive (see 41, FIG. 7) when the two input voltages (at terminals 12, 13) are out of phase by 180° to 360° and the voltage at the terminal 115 is negative (see 41, FIG. 7) when the two input voltages (at terminals 12, 13) are out of phase by zero to 180°.

The two lamps 18, 19 are connected to a source of alternating current lamp voltage at a terminal 116 and thence through silicon controlled rectifiers 117, 118 respectively to ground. Two transistors 119, 120 are connected through their bases and through resistors 121, 122 respectively to the output terminal 115. The emitter of the transistor 119 is connected to the gate electrode of the SCR 117 through a resistor 123. The emitter of the transistor 120 is connected to ground. The collector of the transistor 120 is connected through a resistor 124 to a source of positive voltage at a terminal 125, and also through a resistor 127 to ground, and also to the gate of the SCR 118. The collector of the transistor 119 is connected to the positive voltage terminal 125.

When a signal at the terminal 115 is positive, a signal from the positive voltage supply terminal 125 is delivered through the transistor 119 and the resistors 123, 126 which applies a voltage to the gate of the SCR 117 so that the light 18 is activated through the SCR 117. During this same circumstance, the positive signal from the terminal 115 is applied to the base of the transistor 20 which connects the gate of the SCR 118 directly to ground rendering the SCR 118 non-conductive and accordingly the lamp 19 is not ignited.

When a negative signal appears at the terminal 115, the reverse biased transistor 119 is cut-off and the gate of the SCR 117 is connected to ground through the resistor 126. Hence the lamp 18 is extinguished. At the same time the negative voltage from the terminal 115 applies a reverse bias to the base of the transistor 120 which cuts off transistor 120. This permits a voltage to be applied to the gate of the SCR 118 through the resistor 127, rendering the SCR 118 conductive. In this circumstance the lamp 19 is ignited through the SCR 118.

The potentiometer 112 is adjusted by turning the knob 25 so that the lamps 18, 19 change precisely at a 180 degree phase difference reading.

General Comments

While the present system has been described in a preferred embodiment employing an inverting limiter 26 and a non-inverting limiter 29 in order to simplify the development of correctly indicating signals, it should be apparent to one skilled in the art that the present invention also can be employed by providing two identical limiters 26, 29 which are both inverting amplifiers or both non-inverting amplifiers. In this situation the DC voltmeter 10 would be connected in a reverse fashion in order to provide the desired readings.

While the examples in this specification indicate voltmeter scales 15, 16 (see FIG. 1) reading from 0° to 180° in one direction and from 180° to 360° in the opposite direction, it should be apparent that within the scope of the invention other useful indicators can be applied to the scales. For example, the scales can be expressed in radians or in wave lengths with each scale representing one-half wave length. The scales normally will for convenience indicate phase coincidence at one extreme and phase opposition at the other extreme end of the scales. It is also within the scope of the invention to provide for phase coincidence and phase opposition at some mid scale position and concurrently to provide for a predetermined phase difference at the extreme ends of the scale.

We claim:

1. In a direct reading phase meter for indicating the phase relationship up to one full wave length between two input sinusoidal signals having the same frequency comprising:

means for generating a direct current signal having an amplitude which varies linearly in one direction as the phase differential between the two input signals increases over a first one-half wave length and which varies linearly in the opposite direction as the phase difference between the two input signals increases over the other one-half wave length;

DC voltmeter means having one indicator and two scales, a first of which reads over a range of one-half wave length in one direction and a second of which reads over a range of one-half wave length in the opposite direction;

means for delivering said direct current signal to said voltmeter; and indicating means responsive to the phase difference between the two input signals for indicating a first circumstance when the signals are within said first one-half wave length apart and for indicating a second circumstance when the signals are within the said other one-half wave length apart;

the improvement in said means for generating a direct current signal comprising:

means for converting the two said sinusoidal signals into square wave signals of the same frequency;

means for inverting one of the two said square wave signals; means for adding one said square wave signal and the said inverted square wave signal to produce a summation signal;

means for averaging the said summation signal to produce the said direct current signal;

means for generating a second direct current signal which varies linearly from zero to a maximum value as the phase relationship between the two input signals varies from 0° through 360°; and means responsive to the said second direct current signal for activating said indicating means.

2. The phase meter of claim 1 including electrical circuitry which produces a unidirectional output signal when the phase relationship of the two input signals is from 0° to 180° and produces an opposite unidirectional output signal when the phase relationship of the two input signals is from 180° to 360°.

3. The phase meter of claim 1 wherein:

the said means for generating a second direct current signal includes a differentiator for each of the said two square wave signals to produce a first and a second differentiator output signal, each having one pulse per cycle; and means for generating a direct current signal in response to the lapse between the pulses of the said first and second differentiated output signals.

4. The phase meter of claim 3 wherein the said means for generating a direct current signal is a multivibrator having one of its input terminals connected to the one of the said differentiators and having its other input terminal connected to the other of the said differentiators; and having its output terminal connected to a current averaging means.

5. In a direct reading phase meter for indicating the phase relationship up to one full wave length between two input sinusoidal signals having the same frequency comprising:

means for generating a direct current signal having an amplitude which varies linearly in one direction as the phase differential between the two input signals increases over a first one-half wave length and which varies linearly in the opposite direction as the phase difference between the two input signals increases over the other one-half wave length;

DC voltmeter means having one indicator and two scales, a first of which reads over a range of one-half wave length in one direction and a second of which reads over a range of one-half length in the opposite direction;

means for delivering said direct current signal to said voltmeter; and indicating means responsive to the phase difference between the two input signals for indicating a first circumstance when the signals are within said first one-half wave length apart and for indicating a second circumstance when the signals are within the said other one-half wave length apart;

the improvement in said means for generating a direct current signal comprising:

means for converting the two said sinusoidal signals into square waves of the same frequency;

means for adding the two said square waves to produce a summation signal;

means for averaging the said summation signal to provide the said direct current signal;

means for generating a second direct current signal which varies linearly from zero to a maximum value as the phase relationship between the two input signals varies from 0° through 360°; and means responsive to the said second direct current signal for activating said indicating means.

6. The phase meter of claim 5 including electrical circuitry which produces a unidirectional output signal when the phase relationship of the two input signals is from 0° to 180° and produces an opposite unidirectional output signal when the phase relationship of the two input signals is from 180° to 360°.

7. The phase meter of claim 2 wherein:

the said means for generating a second direct current signal includes a differentiator for each of the said two square wave signals to produce a first and a second differentiator output signal, each having one pulse per cycle, and means for generating a direct current signal in response to the lapse between the pulses of the said first and second differentiated output signals.

8. The phase meter of claim 7 wherein the said means for generating a direct current signal is a multivibrator having one of its input terminals connected to the one of the said differentiators and having its other input terminal connected to the other of the said differentiators; and having its output terminal connected to a current averaging means.

* * * * *